United States Patent
Park

(10) Patent No.: US 8,550,482 B2
(45) Date of Patent: Oct. 8, 2013

(54) BICYCLES THAT CAN BE CONNECTED TO EACH OTHER

(76) Inventor: Min-Sik Park, Gyeonggi-Do (KR)

( * ) Notice: Subject to any disclaimer, the term of this patent is extended or adjusted under 35 U.S.C. 154(b) by 525 days.

(21) Appl. No.: 12/597,913

(22) PCT Filed: Feb. 29, 2008

(86) PCT No.: PCT/KR2008/001189
§ 371 (c)(1),
(2), (4) Date: Mar. 1, 2011

(87) PCT Pub. No.: WO2008/133401
PCT Pub. Date: Nov. 6, 2008

(65) Prior Publication Data
US 2011/0187072 A1    Aug. 4, 2011

(30) Foreign Application Priority Data
Apr. 27, 2007    (KR) .................. 10-2007-0041199

(51) Int. Cl.
*B62K 13/02*    (2006.01)
*B62K 21/08*    (2006.01)

(52) U.S. Cl.
USPC .......................................................... 280/272

(58) Field of Classification Search
USPC ................................................. 280/272, 239
See application file for complete search history.

(56) References Cited

U.S. PATENT DOCUMENTS

| | | | | |
|---|---|---|---|---|
| 516,115 A | * | 3/1894 | Roberts | 280/272 |
| 589,336 A | * | 8/1897 | Carlson | 280/272 |
| 602,279 A | * | 4/1898 | Battersby | 280/272 |
| 841,624 A | * | 1/1907 | Caughell | 280/272 |
| 2,103,674 A | * | 12/1937 | Jackson | 280/272 |
| 4,458,908 A | | 7/1984 | Strong | |
| 4,887,827 A | * | 12/1989 | Heggie | 280/272 |
| 5,860,662 A | * | 1/1999 | Bartoshesky et al. | 280/204 |
| 6,270,103 B1 | | 8/2001 | Grimm | |

(Continued)

FOREIGN PATENT DOCUMENTS

| CN | 86108099 A | 6/1988 |
|---|---|---|
| CN | 2299792 Y | 12/1988 |

(Continued)

OTHER PUBLICATIONS

International Search Report of PCT/KR2008/001189 mailed Jun. 3, 2008.

*Primary Examiner* — Kevin Hurley
(74) *Attorney, Agent, or Firm* — Summa, Additon & Ashe, P.A.

(57) ABSTRACT

The invention allows two single-seat bicycles to be connected to each other to be converted into a multi-seat bicycle. A fixed tube (60), in the center of which a fixed shaft is inserted, is attached to a head tube (6) of a frame (2). A top tube (24) supported by the fixed shaft is relatively pivotally installed on the head tube (6). The fixed tube (60) and the top tube (24) can be connected and disconnected from each other by clutch means (30). In the clutch means (30) are formed a pivot path for defining the un-clutched state and a closed path for defining the clutched state. The clutch means (30) is held at connected and disconnected positions by a position fixation member. Pivoting of the top tube (24) relative to the fixed tube (60) and the operation angle of a handle are limited by a synchronizer.

14 Claims, 18 Drawing Sheets

(56) References Cited

U.S. PATENT DOCUMENTS

| | | | |
|---|---|---|---|
| 8,342,546 B2 * | 1/2013 | Bryant | 280/87.041 |
| 2003/0178806 A1 * | 9/2003 | Nelson | 280/204 |
| 2004/0150261 A1 | 8/2004 | Kawaguchi et al. | |
| 2008/0136137 A1 * | 6/2008 | Huang | 280/272 |

FOREIGN PATENT DOCUMENTS

| | | |
|---|---|---|
| CN | 1291888 C | 12/2006 |
| JP | 51-068051 | 6/1976 |
| JP | 51-068052 | 6/1976 |
| JP | 2001-506947 | 5/2001 |
| JP | 2003-081075 | 3/2003 |
| JP | 2003-220946 | 8/2003 |
| JP | 2004-026037 | 1/2004 |
| JP | 2004-155398 | 6/2004 |
| JP | 2004-175327 | 6/2004 |
| JP | 2006-131115 | 5/2006 |
| JP | 2007-76400 | 3/2007 |
| KR | 1999-0033140 | 5/1999 |
| WO | 02-26554 | 4/2002 |
| WO | 2006/080855 | 8/2006 |

* cited by examiner

US 8,550,482 B2

BICYCLES THAT CAN BE CONNECTED TO EACH OTHER

FIELD OF THE INVENTION

The present invention relates to a one seat bicycle that can be connected to each other, more particularly, the present invention relates to an one seat bicycle that can be used as a bicycle built for two or more people when two or more bicycles are connected to each other in tandem.

THE RELATED ART

Generally, the bicycle includes a front wheel, a rear wheel, a handle, and a frame including a saddle, a front fork end for supporting a center of the front wheel, a rear fork end for supporting a center of the rear wheel, and a pedal or the like at a predetermined position, the handle supported to be steered by a head tube of the frame and the front fork end obliquely extended under the handle.

The bicycle may be usually manufactured as one seat; however, it is well known that the bicycle may be manufactured as a tandem two seat for two or more people.

FIG. 17 shows a typical structure of a tandem seat bicycle, wherein a frame 2 is formed enough long to install two or more seats that two people may ride at one time, a front fork 4 is formed at a front thereof to be supported to be horizontally pivoted by a head tube 6 and to be shaft-supported at a front wheel 8 and a rear fork 10 may support a center of a rear wheel 12 at an end portion thereof.

The long frame 2 may be provided with at least two seats 14 at an upper portion to carry at least two peoples, and also each sprockets 18 and pedals 20 corresponding to the number of the passengers are positioned at a chain stay of a lower portion thereof to drive the bicycles together.

Such a bicycle is no more than a mere tandem bicycle.

In addition, as an alternative of a tandem bicycle, it is well known that a one seat bicycle is characterized by a half frame having only rear wheel at a rear end thereof.

As another alternative, it is well known that two one-seat bicycles may be connected each other in a longitudinal direction or in a transverse direction using an attachment.

FIG. 18 shows one seat bicycle that can be used as a bicycle built for two or more people when two or more bicycle are connected to each other.

Such a bicycle includes a front fork 4, a head tube 6, a rear fork 10, a top tube 24, a seat tube 26, and a down tube 28 or the like at a predetermined position of a frame 2. Accordingly, such a bicycle has the same appearance as the usual one seat bicycle, however, it may be used as the bicycle built for two or more people when a plurality of bicycles is arranged in tandem, all bicycles except the foremost bicycle allow a front wheel 8 separated from the front fork 4, and then, each front fork 4 supported with a center of the rear wheel 12 along with the rear fork 10 of the former bicycle so that the plurality of bicycles is sequentially connected to each other in a line.

[Patent Reference 1] Japan Patent Publication No. 2004-155398

[Patent Reference 2] PCT Patent Publication WO-2002/26554

[Patent Reference 3] PCT Patent Publication WO-2006/080855

[Patent Reference 4] Korea Patent Publication No. 1999-0033140

DESCRIPTION

Technical Problem

Although the bicycle shown in FIG. 18 among the well known bicycles has an appropriate structure for the bicycle built for two or more people, it has a drawback in that all bicycles except the foremost bicycle are not smoothly steered on real driving. This drawback is because of a handle structure of bicycle as described thereafter.

As to lightly operate the handle in such a bicycle, the front fork 4 is mounted obliquely to the head tube 6 of the frame 2. A slope direction of the front fork 4 is changed to intersect the frame 2 whenever the front fork 4 is steered. Such a change of the slop direction of the front fork 4 does not matter when the bicycle is used as one seat change of the direction.

However, in case of the bicycle built for two or more people, the front fork 4 of the latter bicycle supports a center of the rear wheel 12 of the former bicycle, and accordingly, it always moves straight to the rear fork 10 of the former bicycle not to intersect the frame 2. That is, the front fork 4 of the latter bicycle along with the rear fork 10 of the former bicycle is vertical to ground during driving, and accordingly, it wrests the frame 2 oppositely to the steering direction.

When the plurality of bicycles is sequentially connected to each other in a line, the torsion generated oppositely to the steering direction is increased for the more latter bicycle, and accordingly, the last bicycle topples over with not driven.

As described above, although the bicycle that can be connected to each other shown in FIG. 18 may be used as the one seat bicycle and also may be used as the bicycle built for two or more people when two or more bicycle are connected to each other in tandem, it must settle the above-described problem of on the steering.

In addition, the bicycle that can be connected to each other shown in FIG. 18 has a problem in that all passengers can operate a brake when it is used as the bicycle built for two or more people.

Considering a safe driving, it is desired that only the foremost driver may operate a brake. However, it is impossible to simultaneously control a plurality of bicycles by means of a person's grip strength.

The present invention has an object to provide one seat bicycle that can be connected to each other having advantages of the latter bicycle not toppling over during steered as well as converting the one seat bicycle to the bicycle built for two or more people when two or more bicycle are connected to each other in tandem.

In addition, the present invention has an object to provide one seat bicycle that can be connected to each other having advantages of only the foremost operator damping all connected bicycles.

Technical Solution

One embodiment of the present invention provides a bicycle that can be connected to each other, the bicycle comprising a fixed tube attached to a head tube for supporting a front fork and having a fixed shaft inserted therein, a top tube pivotally mounted on the fixed shaft, a clutch means for converting a relation between the fixed tube and top tube from an un-clutch state to a clutch state, a synchronizer for controlling a pivot angle of the top tube rotated to the fixed tube to be in accordance with a steering angle of a handle, wherein the clutch state is what the top tube is rotated to the fixed tube and the un-clutch state is what the top tube is not rotated.

The clutch means converts the clutch state for integrally connecting the top tube to the fixed tube into the un-clutch state for separating and relatively rotating the top tube to the fixed tube and selects the clutch state in case of usage as the one seat bicycle and the un-clutch state for the latter bicycles in case of usage as two or more seat bicycles.

In addition, the clutch means allows the top tube of all the latter bicycles to be relatively rotated to the fixed tube in case of the two or more seat bicycles, so that the torsion generated by the direction conversion of the front fork is extinguished by the pivot action and thus the latter bicycles does not topple over and safely drives on steering.

Another exemplary embodiment of the present invention provides a bicycle having a front wheel of a front portion of a frame shaft-supported by a front fork and a rear wheel shaft-supported by a rear fork each supporting a center of a front wheel and a rear wheel, comprises a fixed tube attached to a head tube for supporting the front fork, a fixed shaft inserted into the fixed tube and having a small-diameter shaft at the free end thereof, a plurality of bearings mounted opposite to each other via a bush on the small-diameter each other, a top tube pivotally supported on the bearings, a fixed protrusion penetrating the external circumference portion of the top tube and attached to it via the bush, a clutch means having a slit for guiding the fixed protrusion portion, a pivot path formed in an arc-shaped groove or circular shaped groove to define a un-clutch state, a close path formed in a dot shaped groove to define a clutch state on the external circumference portion thereof, and the position fixing member for ensuring the moved position thereof, and disposed to interrupt the fixed tube and the top tube in the un-clutch state to pivot the top tube to the fixed tube or in the clutch state not to pivot the top tube to the fixed tube, and a synchronizer for controlling a pivot angle of the top tube rotated to the fixed tube to be in accordance with a steering angle of a handle.

In the exemplary embodiment of the present invention, the clutch means is provided such that it is freely moved between the fixed tube and top tube and it is converted between the clutch state to be rotated along the circular-shaped groove of the pivot path and the un-clutch state not to be moved by engaged with the dotted groove of the close path.

In addition, the clutch means is maintained by the position fixing member at the moved position, the rotation of the top tube is controlled to be in accordance with a steering angle of a handle by the synchronizer.

Yet another exemplary embodiment of the present invention provides a bicycle having a front fork and a rear fork each supporting a center of a front wheel and a rear wheel, the bicycle includes a fixed tube attached to a head tube for supporting the front fork, a fixed shaft inserted into the fixed tube and having a small-diameter shaft at the free end thereof, a plurality of bearings mounted opposite to each other via a bush on the small-diameter each other, a top tube pivotally supported on the bearings, a fixed protrusion penetrating the external circumference portion of the top tube and attached to it via the bush, a clutch means having a slit for guiding the fixed protrusion portion, a pivot path formed in an arc-shaped groove or circular shaped groove to define a un-clutch state, and a close path formed in a dot shaped groove to define a clutch state on the external circumference portion thereof, a position fixing member for ensuring the moved position thereof, and disposed to interrupt the fixed tube and the top tube in the un-clutch state to pivot the top tube to the fixed tube or in the clutch state not to pivot the top tube to the fixed tube, and a synchronizer for controlling a pivot angle of the top tube rotated to the fixed tube to be in accordance with a steering angle of a handle.

The clutch means is provided to move between the fixed tube and the top tube so that it may convert the un-clutch state pivoting through the pivot path of circular groove into the clutch state not pivoting by means of the engagement with the close path of the open-end groove and it may convert the clutch state into the un-clutch state and inverse. In this case, the clutch means is provided with an internal protrusion portion which may slide through the pivot path and the close path. In addition, the pivot path of circular groove and the close path of the open-end groove are formed on the same position.

Yet another exemplary embodiment of the present invention provides a bicycle that can be connected to each other, the bicycle comprising a frame, a front wheel and a rear wheel each supported by a front fork and a rear fork of the frame, a fixed tube attached to a head tube for supporting the front fork, a fixed shaft inserted into the fixed tube and having a small-diameter shaft at the free end thereof, a plurality of bearings mounted opposite to each other via a bush on the small-diameter each other, a top tube pivotally supported on the bearings, a fixed protrusion penetrating the external circumference portion of the top tube and attached to it via the bush, a pivot path formed in an arc-shaped groove or circular shaped groove on the external circumference portion of the top tube to define a un-clutch state, a close path formed in an open end groove extended orthogonally to the pivot path of the fixed shaft to define a clutch state, a clutch means provided with an inward protrusion guided though the pivot path and the close path, a slit for guiding the fixed protrusion, and an external flange formed at the predetermined position of the external circumference thereof, a housing including first and second stay grooves at a upper surface thereof and shielding the head tube and the top tube, a bracket for supporting between the external flanges of the clutch means, a guide bar for supporting the bracket at the inner portion of the housing, the position fixing member being a lock handle disposed such that it is going and returning between the first stay groove and the second stay groove to move the bracket between the clutch state and the un-clutch state to ensuring the moved position thereof, and disposed to interrupt the fixed tube and the top tube in the un-clutch state to pivot the top tube to the fixed tube or in the clutch state not to pivot the top tube to the fixed tube, and a synchronizer for controlling a pivot angle of the top tube rotated to the fixed tube to be in accordance with a steering angle of a handle.

The position fixing member allows the clutch means to move according to the bracket to be in the un-clutch state or in the clutch state by displacing the lock handle in the first stay groove or the second stay groove and simultaneously ensures the clutch means at the moved position.

The position fixing member is a ball plunger including a boll inserted into a corresponding position of the pivot path or close path and a spring for suppressing the ball such that the ball is always interlocked into the pivot path or close path.

The position fixing member includes a clamp for surrounding an one end portion of the external circumference portion of the clutch means, a cam shaft penetrating both ends of the clamp and having a flange at an one end portion, a knob provided at an one end portion of the cam shaft so as to tighten or release the clamp.

The synchronizer is fixed at one end potion to the front fork and free at the other end portion having a rod extended parallel to it and a guide ring which the rod is inserted and connected in the un-clutch state.

The synchronizer is composed of a pair of bevel gear arranged opposite to each other between the front fork and the clutch means and gear-connected.

A brake system that can be connected to each other by attaching a rear wheel of one seat bicycle to a front wheel of another one seat bicycle according to exemplary embodiment of the present invention includes a brake system comprising a rotary encoder for outputting a pulse signal according to a position variance of a brake lever of the given bicycle, a connecting cable including a plug connected to just former bicycle, a socket connected to just latter bicycle, a spool for wounding or raveling a branch line connected to the given bicycle, a ratchet disposed concentrically to the spool, a ratchet finger disposed to engaged with the ratchet, a solenoid for reinforcibly separating the ratchet and the ratchet finger, a motor connected to the spool via a deceleration gear, a brake modulator having a controlling board for driving the solenoid and the motor in response to the present state of the brake, and an encoder cable for electrically connecting the rotary encoder and the brake modulator.

In the exemplary embodiment of the present invention, when the former passenger operates a brake lever, the corresponding pulse is generated from the rotary encoder, the pulse signal is inputted to the all of the brake modulator via the encoder cable thereby starting the control of the brake.

The controlling board includes a cable connection aware circuit for recognizing whether the plug is connected to the just former socket and whether the socket is connected to the just latter plug, a supply determining circuit for selectively supplying a power according to the order of the bicycles, i.e., the foremost or the latter bicycles, a volume aware circuit for converting and outputting a pulse signal of the rotary encoder into a phase signal, a cluck generating circuit for a signal waveform necessary to a driving of the motor and the solenoid; and a pulse width modulating signal generating circuit for assembling stepped waveforms of a frequency determining circuit and a phase signal of the volume aware circuit and outputting a motor driving signal, a signal portion having a signal continuity determining circuit for recognizing whether the output of the volume aware circuit is varied during a predetermined time, an input/output controlling circuit outputting a solenoid driving signal according to the output of the signal continuity determining circuit more fast than a motor driving signal and outputting amended signal to the latter bicycle, and a motor driving circuit and a solenoid driving circuit for each driving the motor and solenoid according to the signal of the input/output controlling circuit.

The cable connection aware circuit includes the plug connection aware circuit for recognizing whether the plug is connected to the just former socket and the socket connection aware circuit for recognizing whether the socket is connected to the just latter plug, whose output signal denotes whether the present bicycle is one of the last bicycle, the latter bicycles, the foremost bicycle, or the one seat bicycle.

In case of the foremost bicycle, the supply determining circuit is controlled such that it supplies a power source to the signal portion, the input/output controlling circuit, the motor driving circuit, and the solenoid driving circuit, and in case of the last or latter bicycles, it is controlled such that it stops a supply of the power source to only the signal portion and each of the motor and the solenoid is controlled by the signal which the foremost bicycle outputs, and in case of the one seat bicycle, the supply determining circuit is controlled such that it supplies a power source to only the cable connection aware portion and it stops a supply of the power source to any other portions.

In the signal portion, when the volume aware circuit outputs a position determining signal according to an increase of the output signal of the rotary encoder, the frequency determining circuit outputs a constant frequency signal as a result of a waveform signal of the cluck generating circuit to the solenoid driving circuit and outputs a stepped waveform for driving a motor, the pulse width modulation signal generating circuit outputs a pulse width modulation signal of a duty rate obtained by assembling the phase determining signal (in addition, the volume aware circuit receiving the output of the rotary encoder, recognizing whether the received signal is increased or decreased, outputting a signal for determining the phase) and the stepped waveform.

A signal continuity determining circuit controls such that the solenoid driving signal is outputted faster than the motor driving signal, when the output signal of the rotary encoder is varied during a predetermined time.

The input/output controlling circuit controls the solenoid driving circuit and the motor driving circuit according to the output signals of the pulse width modulation signal generating circuit and the solenoid driving signal generating circuit while it outputs the solenoid driving signal faster than the motor driving signal when it receives the signal from the signal continuity determining circuit, and outputs the output signals of the pulse width modulation signal generating circuit and the solenoid driving signal generating circuit to the latter bicycles, and accordingly controls all the bicycles at the same condition.

In addition, when the output signal of the rotary encoder is varied by operating the brake lever, the input/output controlling circuit intercepts the solenoid driving signal and the motor driving signal to maintain at the present brake state without consuming a power source although the input/output controlling circuit outputs the motor driving signal with the duty rate as a result of the pulse width modulation signal and the solenoid driving signal.

In the latter bicycles, the power source is supplied to only the input/output controlling circuit and the driving portion, and accordingly, all the latter bicycles are controlled to be synchronized by means of the signal of the foremost bicycle.

Advantages Effects

In a one seat bicycle that can be used as a bicycle built for two or more people when two or more bicycles are connected to each other in tandem, a top tube is separated from the head tube and a clutch means is interposed and switched between the top tube and the head tube.

Thus, in case of a bicycle for built for two or more people, all the latter bicycles become the un-clutch state so that the top tube and the head tube are relatively rotated. And accordingly, on steering, the top tube is rotated so that the frame is maintained without toppling over against the steering direction, and also, when they become the clutch state to use as the one seat bicycle, the top tube and the head tube are integrally connected so that the steering is performed in the same manner as the given one seat bicycle.

In addition, the brake system may ensure a running safety when used as a bicycle built for two or more people when two or more bicycles are connected to each other in tandem because each brake modulator is connected in a line and the brakes of all the latter bicycles is operated at the same time by operating only the brake of the foremost bicycle.

REFERENCE NUMBER DESCRIPTION OF ESSENTIAL ELEMENTS

Figure 1:
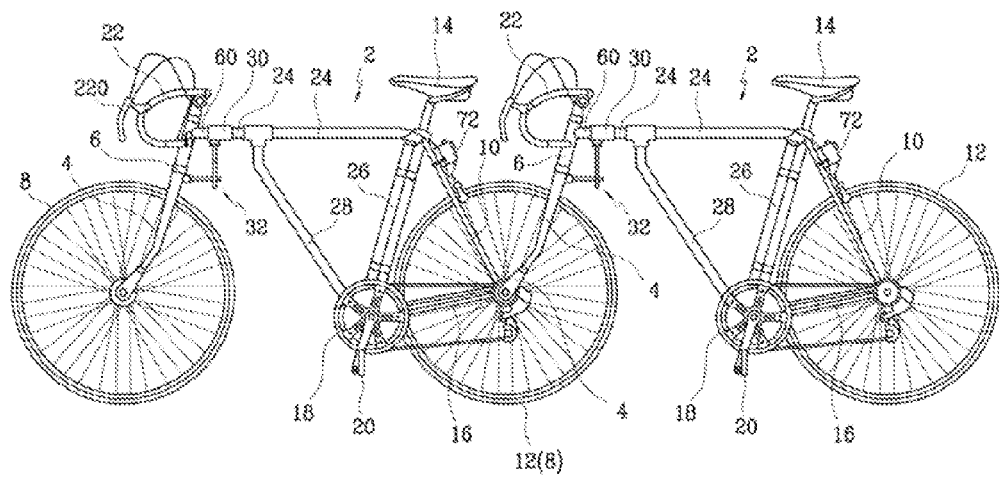
FIG. 1 is a side view for showing a first exemplary embodiment of a bicycle of the present invention.

| | | | |
|---|---|---|---|
| 4: | front fork | 6: | head tube |
| 22: | handle | 220: | brake lever |
| 222: | rotary encoder | 224: | encoder cable |
| 24: | top tube | 240; | fixed protrusions |
| 242: | bush | 30: | clutch means |
| 300: | long hole | 302: | boss |
| 304: | inward protrusion | 306: | outward flange |
| 32: | synchronizer | 320: | rod |
| 322: | guide ring | 34: | pivot passage |
| 36: | close path | 38: | stopper means |
| 380: | cramp | 382: | knob |
| 384: | flange | 386: | cam shaft |
| 388: | first stay groove | 390: | second stay groove |
| 392: | lock spring | 394: | lock handle |
| 40: | housing | 400: | guide bar |
| 402: | yoke | 404: | bracket |
| 406: | handle shaft | 60: | fixed tube |
| 62: | fixed shaft | 64: | small diameter shaft |
| 66: | bearing | 68: | screw portion |
| 70: | nut | 72: | brake modulator |
| 720: | cable for connecting the front bicycle | 722: | socket |
| 724: | plug | 73: | battery |
| 732: | solar battery | 734: | generator |
| 74: | controlling board | 75: | supplier |
| 750: | commutating circuit | 752: | supply determining circuit |
| 76: | cable connection aware circuit | 762: | plug connection aware circuit |
| 764: | socket connection aware circuit | 77: | signal portion |
| 770: | cluck generating circuit | 772: | frequency determining circuit |
| 774: | volume-aware circuit generating circuit | 776: | pulse width modulating signal |
| 778: | signal continuity determining circuit generating circuit | 780: | solenoid driving signal |
| 80: | input/output controlling circuit | 82: | motor driving circuit |
| 84: | solenoid driving circuit | 86: | motor |
| 860: | output gear | 862: | deceleration gear |
| 864: | ratchet gear | 866: | spool |
| 88: | solenoid | 880: | ratchet finger |
| 120: | V brake | 122: | branch line |
| 124: | brake wire | | |

MODE FOR INVENTION

An exemplary embodiment of the present invention is described in detail refereeing the attached drawings.

[Embodiment 1]

A bicycle according to an exemplary embodiment of the present invention the present invention includes a typical structure of one seat that a front fork 4 of a frame 2 supports a center of a front wheel 8 at an end portion with supported by a head tube 6 while a rear fork 10 disposed backwards thereof supports a center of a rear wheel 12 at an end potion, and a saddle 14, chain stay 16 a pair of sprocket 18, pedal 20, a handle 22, and brake lever 220 are provided.

In a bicycle according to an exemplary embodiment of the present invention, a top tube 24 may be connected to the head tube 6 through a fixed tube 60, a clutch means 30 may be provided between the top tube 24 and the fixed tube 60, and also a synchronizer 32 may be provided between a upper portion of the front fork 4 and a lower portion of the clutch means 30.

In a bicycle according to an exemplary embodiment of the present invention, a typical down tube 28 obliquely mounted to the head tube 6 so as to form the frame 2 may be omitted or connected along the top tube 24 as shown.

The clutch means 30 selects one of a clutch state which the top tube 24 is integrally connected to the fixed tube 60 and a un-clutch state which the top tube 24 is relatively pivoted to the fixed tube 60.

Figure 2:
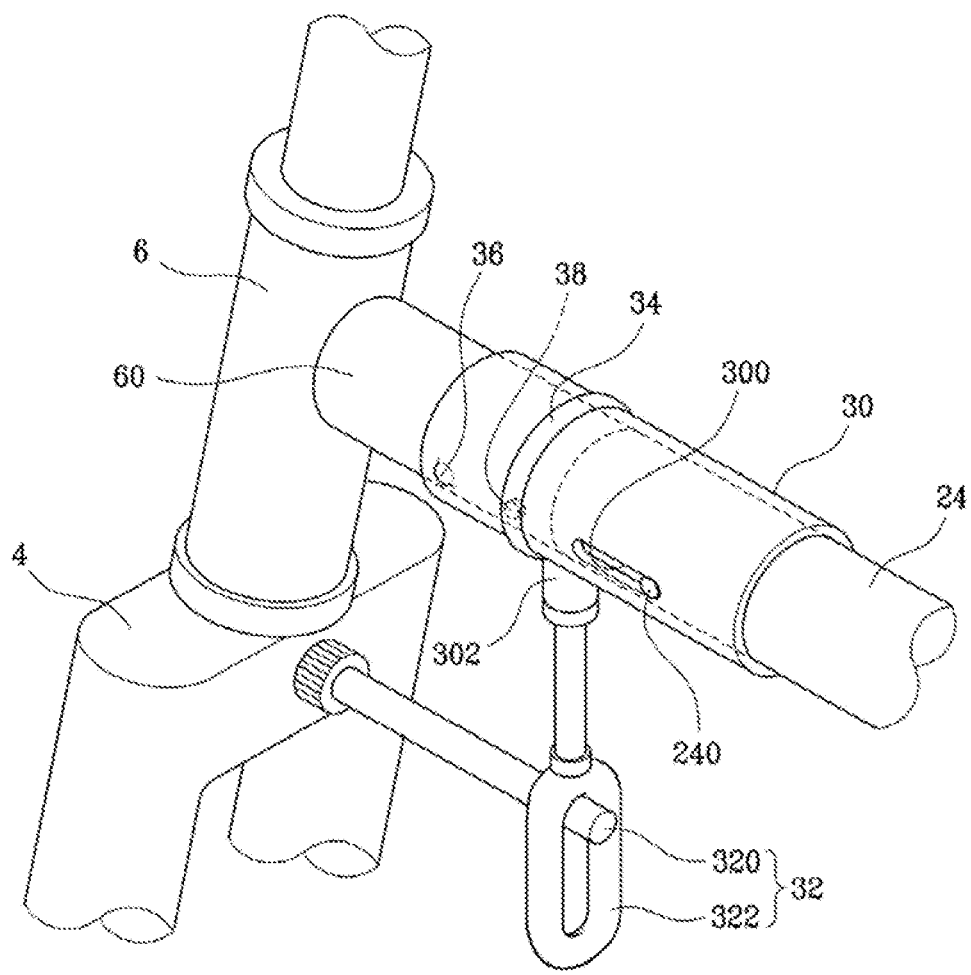
FIG. 2 is a partial perspective view for showing primary elements of FIG. 1.

In a bicycle according to an exemplary embodiment of the present invention as shown in FIG. 2, the clutch means 30 is composed to slide along a shaft direction of the top tube 24 when a plurality of fixed protrusions 240 symmetrically attached along the external circumference portion of the top tube 24 are inserted into slits 300 thereof.

By means of the slide movement of the clutch means 30, a relation between the top tube 24 and the fixed tube 60 may be converted into the clutch/un-clutch state. For this, the clutch means 30 is provided with a pivot path 34 which relatively rotated to the fixed tube 60 integrally with the top tube 24, a close path 36 for restraining the clutch means such that the clutch means 30 is not rotated, and the stopper means 38 for determining the clutch/un-clutch state of the clutch means 30.

In this embodiment, the pivot path 34 is an arc-shaped or circular-shaped groove and the close path 36 is a dotted groove at a predetermined position of the external circumference portion of the clutch means 30, the position fixing member 38 is a ball plunger symmetrically disposed on the external circumference portion of the fixed tube 60.

The position fixing member 38 is composed of a ball plunger having a ball inserted into the pivot path 34 or close path 36, a spring for suppressing the ball such that the ball is always interlocked into the pivot path or close path, is positioned With the above-described structure, when the position fixed member 38 is arrived at the pivot path 34 and simultaneously the clutch means is moved at the un-clutch state to be freely rotated, while when the position fixed member 38 is arrived at the close path 36, the clutch means is moved at the clutch state not to be rotated.

For example, the clutch means 30 becomes the un-clutch state which it may rotate when the position fixing member 38 is disposed in the pivot path 34 while it becomes the clutch state which it may not rotate when the position fixing member 38 is disposed in the close 36.

A synchronizer 32 includes a rod 320 extended parallel to the internal surface of the front fork 4 and a guide ring 322 attacked vertically from the bottom surface of the clutch means 30. In addition, the position of the guide ring and rod may be changed with each other, and the guide ring 322 may be formed in a fork shape.

The synchronizer 32 becomes a connection state when the clutch means 30 slides toward the fixed tube 60 and becomes the un-clutch state, the guide ring 322 is moved along with the clutch means 30 and a rod 320 is passed therethough, while it converts a separation state when the clutch means 30 moves backwards and becomes the clutch state, the rod 320 is released from the guide ring 322.

The synchronizer 32 becomes connection state whenever the position fixing member 38 is disposed in the pivot path 34 and allows the direction conversion of the front fork 4 to be transferred to the clutch means in form of a rotation of the rod 320 and the guide ring 322 so that the relation between the front fork 4 and the clutch means 30 is maintained.

The guide ring 322 has a firm structure, in this an exemplary embodiment of the present invention; the guide ring 322 is reinforced by interposing a shaft thereof in a center of a boss 302 mounted on the bottom surface of the clutch means 30.

Figure 3:
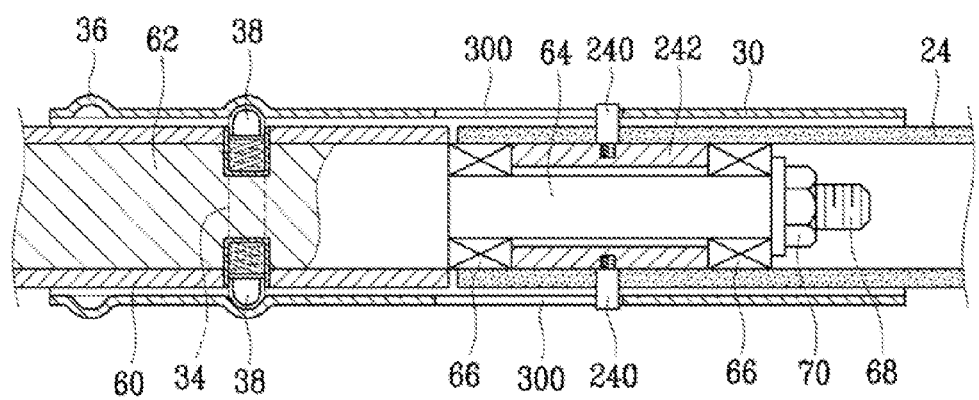
FIG. 3 is a cross-sectional view of FIG. 2 showing an un-clutch state of a clutch means.

In addition, it is preferable that a structure between the top tube 24 and the fixed tube 60 is smoothly rotatable because the top tube 24 is dispose to be rotated to the fixed tube 60, as shown in FIG. 3, the fixed tube 60 has a fixed shaft 62 attached at a center thereof.

The fixed shaft 62 has a small-diameter shaft at an end portion, that pivotally support a plurality of bearings 66, the bearings 66 are arranged opposite to each other by means of bush 242 so to pivotally support the top tube 24.

The small diameter shaft 64 has a screw portion 68 at end portion thereof and interlocked by a nut 70 so that it keeps the bearing 66 from deviated.

In addition, the bush 242 is integrally provided with a fixed protrusion 240 passed through the external circumference portion of the top tube 24 and extended to the slit 300 of the clutch means 30.

With above-described structure, the top tube 24 is rotated always synchronizing with the clutch means 30 and the clutch state or the un-clutch state is selected by a shaft-directional movement of the clutch means 30.

In case that it is used as a bicycle built for two or more people when two or more bicycle are connected to each other in tandem, the foremost bicycle is selected as the clutch state and the latter bicycles are selected as the un-clutch state.

Figure 4:
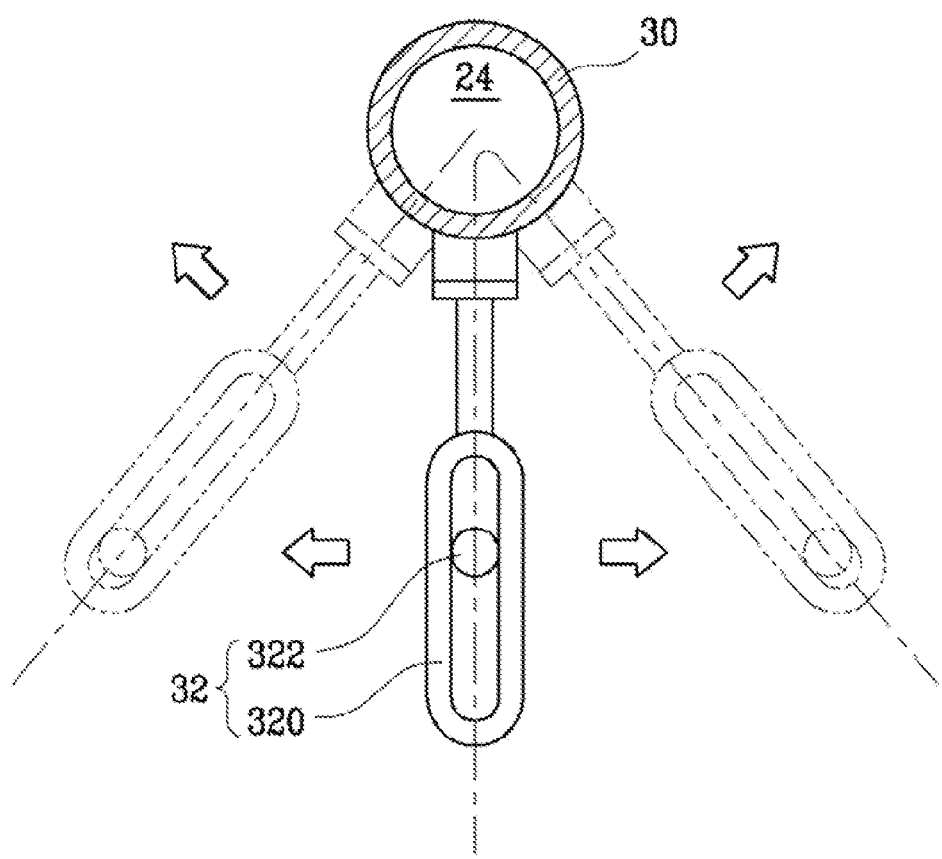
FIG. 4 is a schematic view for showing a pivot movement of a top tube at a un-clutch state.

At the clutch state of the clutch means 30, the frame 2 of the latter bicycles is inclined outward a steering direction of the former bicycle because the front fork 4 is followed and steered according to the rear wheel of the former bicycle. However, in case that the latter bicycles of the un-clutch state are steered, although the front fork 4 along with the rear fork 10 of the former bicycle is vertical to the ground, as pull out and twist its frame 2, the top tube 24 of the frame 2 is the un-clutch state which it may be rotated to the fixed tube 60 connected to the front fork 4 so that a reaction against the torsion and a force which the rod 320 of the synchronizer 32 allows the guide ring 322 to be rotated in the same direction as a steering of the front fork 4 as shown in FIG. 4 defuses the torsion, and accordingly, the bicycles may not topple over and may be safely and normally steered. For example, the front fork 4 along with the rear fork 10 of the former bicycle is vertical to the ground, as pull out and twist its frame 2, the top tube 24 of the frame 2 is the un-clutch state which it may be rotated to the fixed tube 60 connected to the front fork 4 so that a reaction against the torsion and a force which the rod 320 of the synchronizer 32 allows the guide ring 322 to be rotated in the same direction as a steering of the front fork 4 defuses the torsion. As a result, the frame 2 of the latter bicycles may not topple over during steering and may be safely and normally converted according to the front fork 4.

Although it is used as a bicycle built for two or more people when two or more bicycle are connected to each other in tandem, the steering of the latter bicycles may be performed as the same as the typical one seat bicycle.

Figure 5:
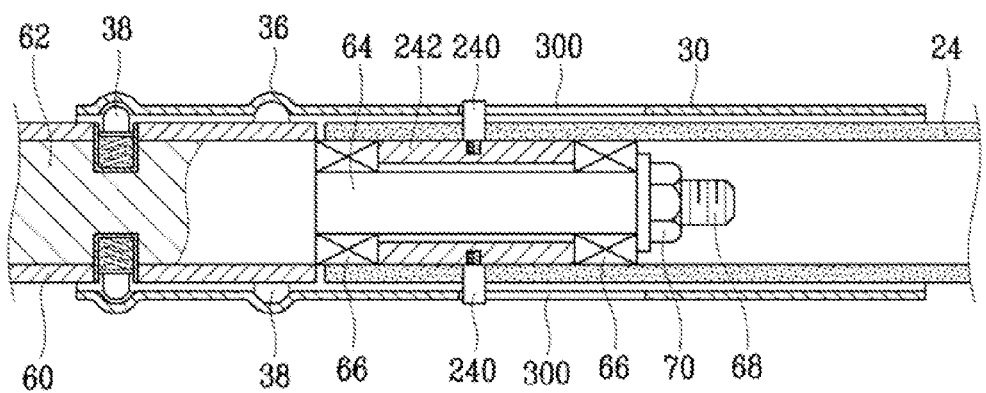
FIG. 5 is a cross-sectional view showing a clutch state of a clutch means in correspondence with FIG. 3.

In addition, when it is used as the one seat bicycle, the clutch state which the clutch means 30 slides toward the top tube 24 is selected as shown in FIG. 5, at the clutch state, the close path 36 keeps the position fixing member 38 from moving, the top tube 24 is integrally connected to the fixed tube 60 by means of the clutch means 32 and the guide ring 322 is separated from the rod 320 connected to the front fork 4.

Figure 6:
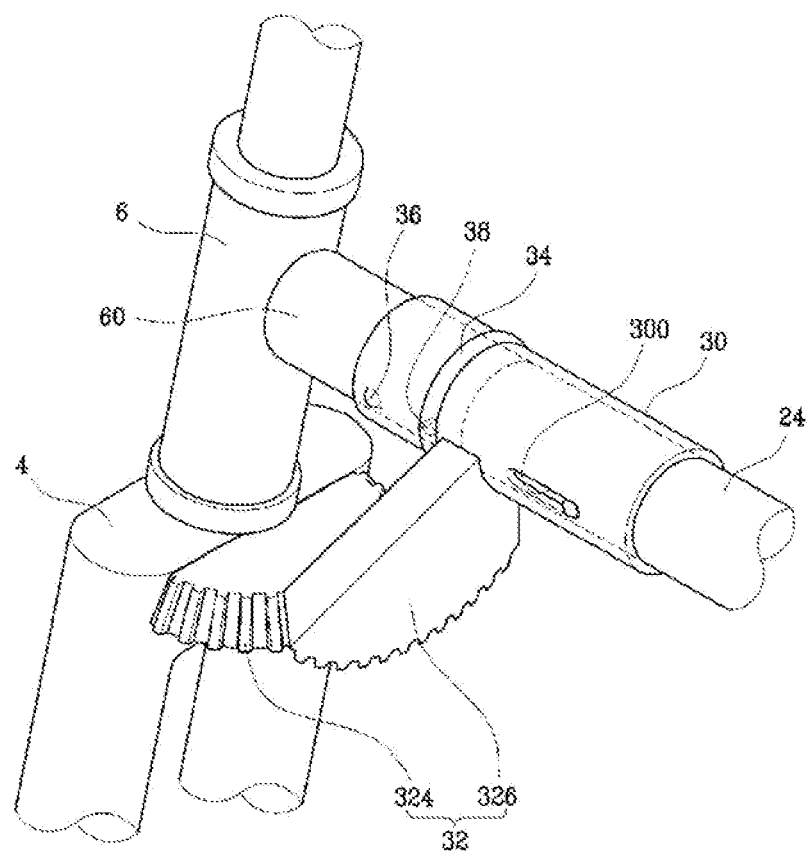
FIG. 6 is a perspective view of a synchronizer applied to the present invention.

In this exemplary embodiment, the synchronizer 32 is described with the rod 320 and guide ring 322; however, it may include a pair of bevel gears 324 and 326 each attached at a predetermined position of the front fork 4 and the clutch means 30 be engaged with each other at the un-clutch state as shown in FIG. 6.

[Embodiment 2]

The bicycle according to an exemplary embodiment of the present invention is not limited.

Figure 7:
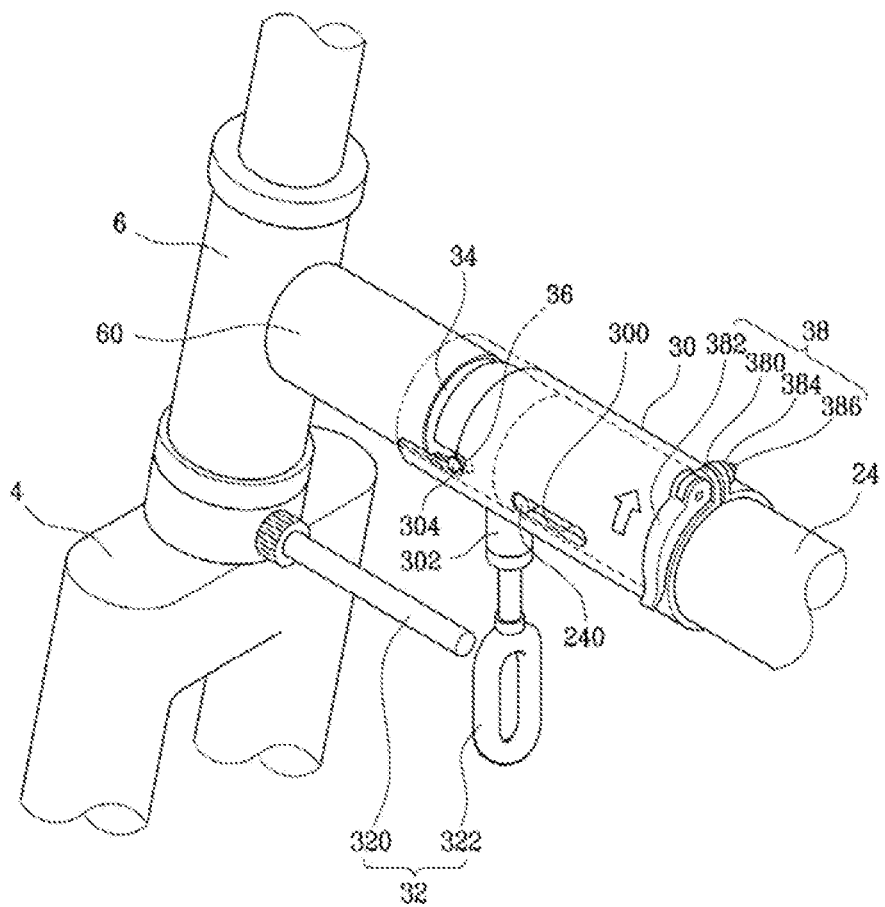
FIG. 7 is a partial perspective view for showing primary elements of a second exemplary embodiment of a bicycle of the present invention.
Figure 8:
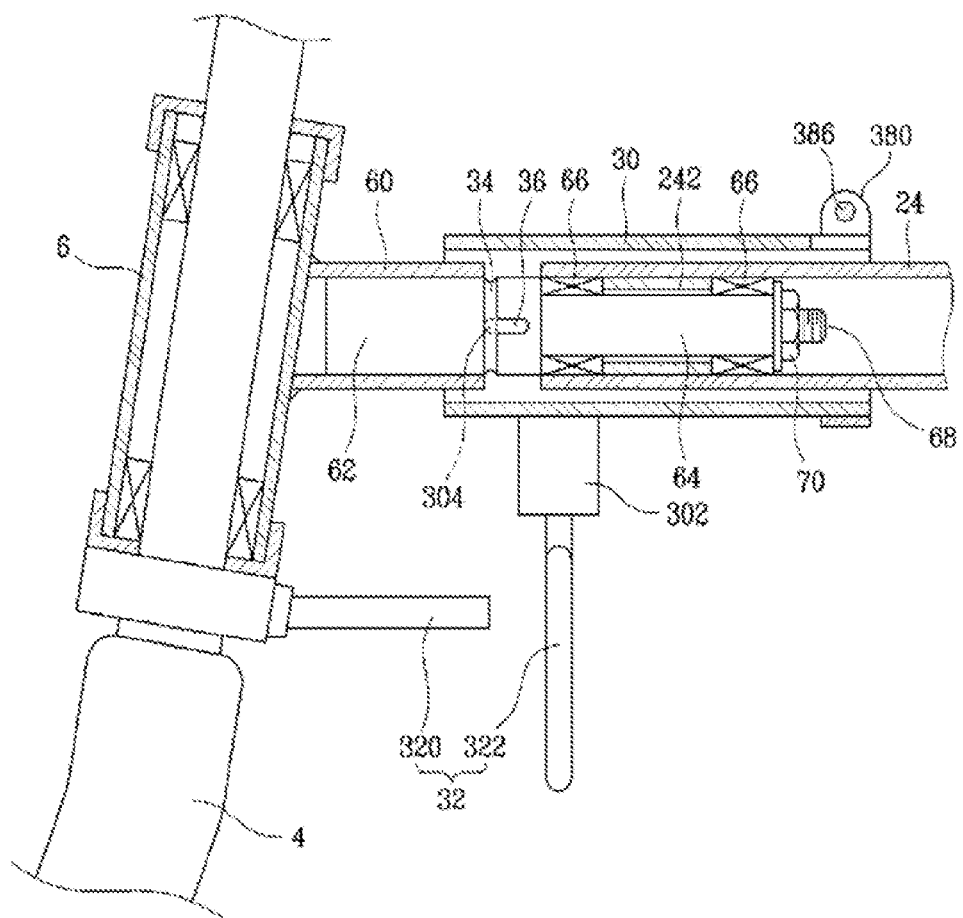
FIG. 8 is a side cross-sectional view of FIG. 7
Figure 9:
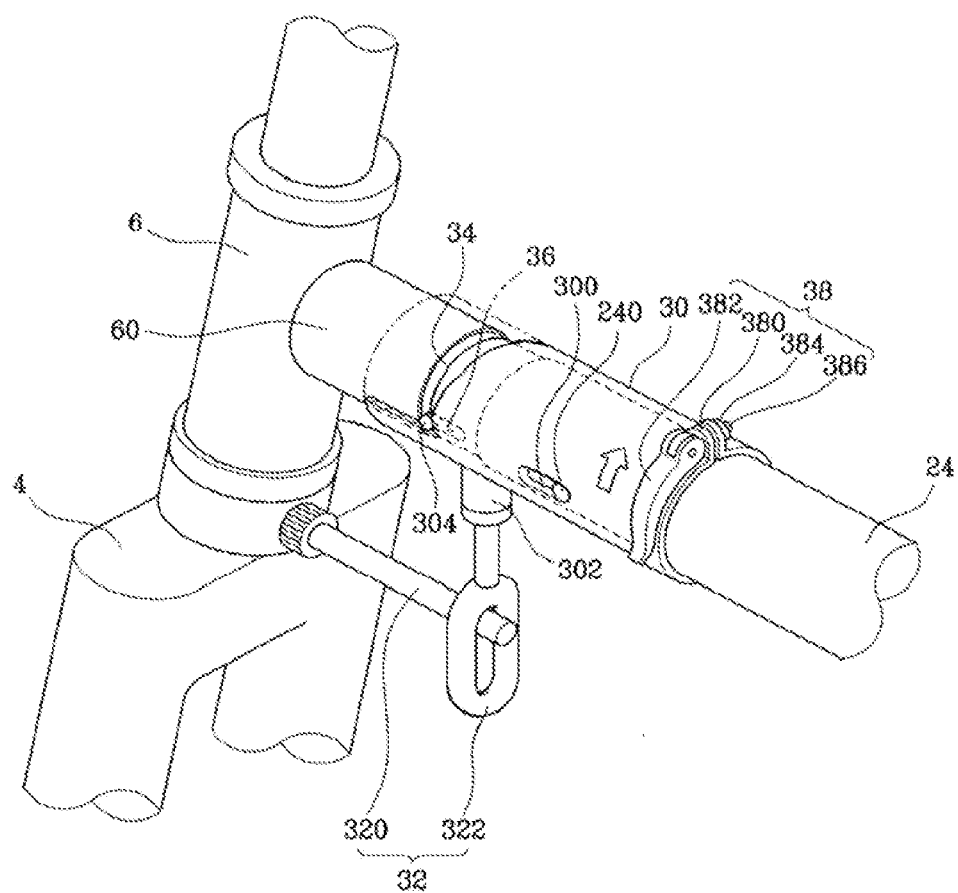
FIG. 9 is a partial perspective view for showing an un-clutch state of a clutch means in correspondence with FIG. 6.

FIG. 7 to FIG. 9 shows a bicycle according to a second exemplary embodiment of the present invention.

This second exemplary embodiment has a different structure in the pivot path 34, the close path 36, and the position fixing member 3 compared to the first exemplary embodiment.

In FIG. 7, the pivot path 34 and the close path 36 are formed on the external circumference portion of the fixed shaft 62 which supported by the fixed tube 60 and the position fixing member 38 is installed at one end portion of the clutch means 30. Particularly, the pivot path 34 is formed as a circular groove at an external circumference portion of the fixed shaft 62, and also the close path 36 is formed as open-end groove which is extended in a direction orthogonal to the fixed shaft 62. An inward protrusion 304 attached on the clutch means 30 is inserted and slide along the pivot path 34 and the close path 36. The position fixing member 38 includes a clamp 380 surrounding the external circumference portion of the clutch means 30, a knob 382 for clamping or releasing the clamp 380 by means of a cam reaction, and a cam shaft 385 having one end portion passed through both ends of the clamp 380 and connected to the knob 382, and the other end portion provided with a flange 384. Since the plurality of fixed protrusions 240 symmetrically attached to the external circumference portion of the top tube 24 are inserted along the slit 300 of the clutch means 30, the top tube 24 is integrally rotated with the clutch means 30.

Since the inward protrusion 304 of the clutch means 30 is disposed in the close path 36, the clutch state which the fixed tube 60 is integrally connected to the top tube 24 becomes and the rod 320 and the guide ring 322 of the synchronizer 32 are separated in the same manner as the one seat bicycle.

In this exemplary embodiment, as shown FIG. 8, the fixed shaft 62 has a small-diameter shaft at an end portion, that pivotally support a plurality of bearings 66. The bearings 66 are arranged opposite to each other by means of bush 242 so to pivotally support the top tube 24 to the fixed shaft 62.

When the knob 382 of the position fixing member 38 is operated in an arrow direction of FIG. 7, the both ends of the clamp 380 are loosed and the clutch means 30 is released to move in a shaft direction.

When a driver allows the loosed clutch means 30 to slide toward the fixed tube 60, the inward protrusion 304 of the clutch means 30 changes from the close path 36 to the pivot path 34. In such a position, when the knob 382 is operated in an arrow direction of FIG. 9, the un-clutch state becomes, which the clutch means 30 and the top tube 24 may rotate to the fixed tube 60.

Likewise, in the second exemplary embodiment of FIG. 7 to FIG. 9, only the movement of the clutch means 30 can select the clutch state for integrally connecting the top tube to the fixed tube and the un-clutch state for separating and relatively rotating the top tube to the fixed tube.

Figure 10:
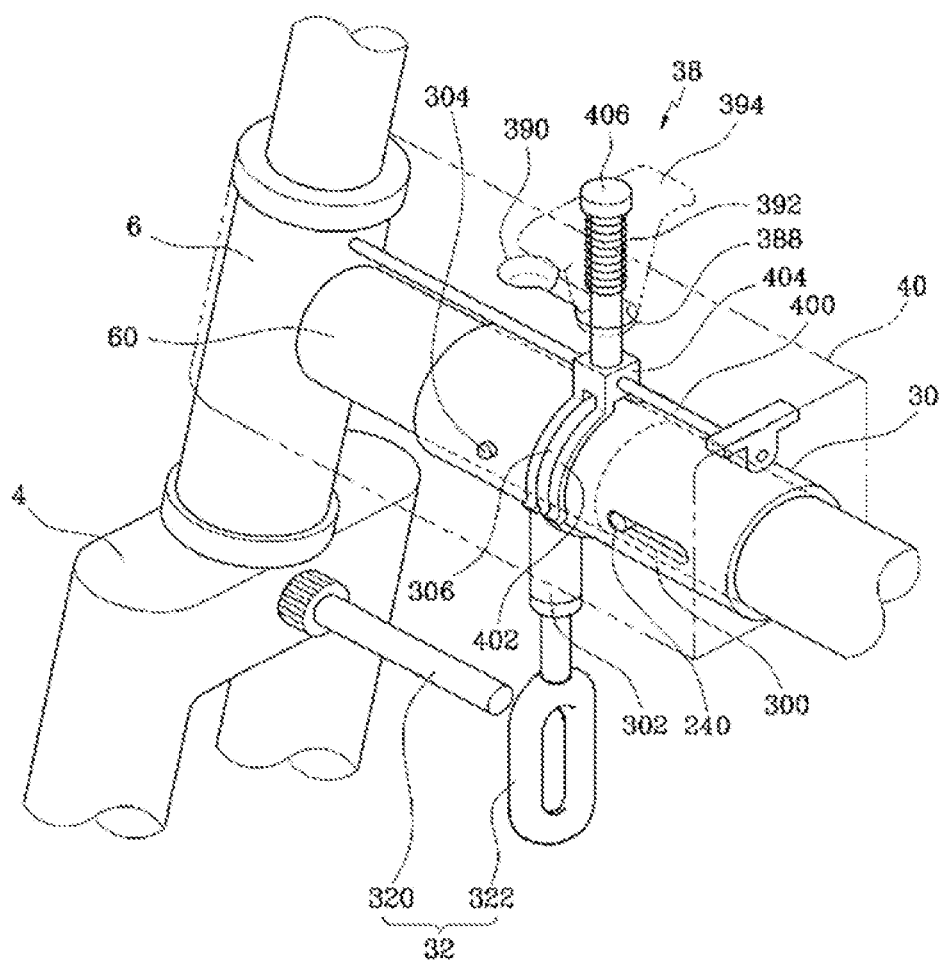
FIG. 10 is a partial perspective view for showing a third exemplary embodiment of a bicycle of the present invention.
Figure 11:
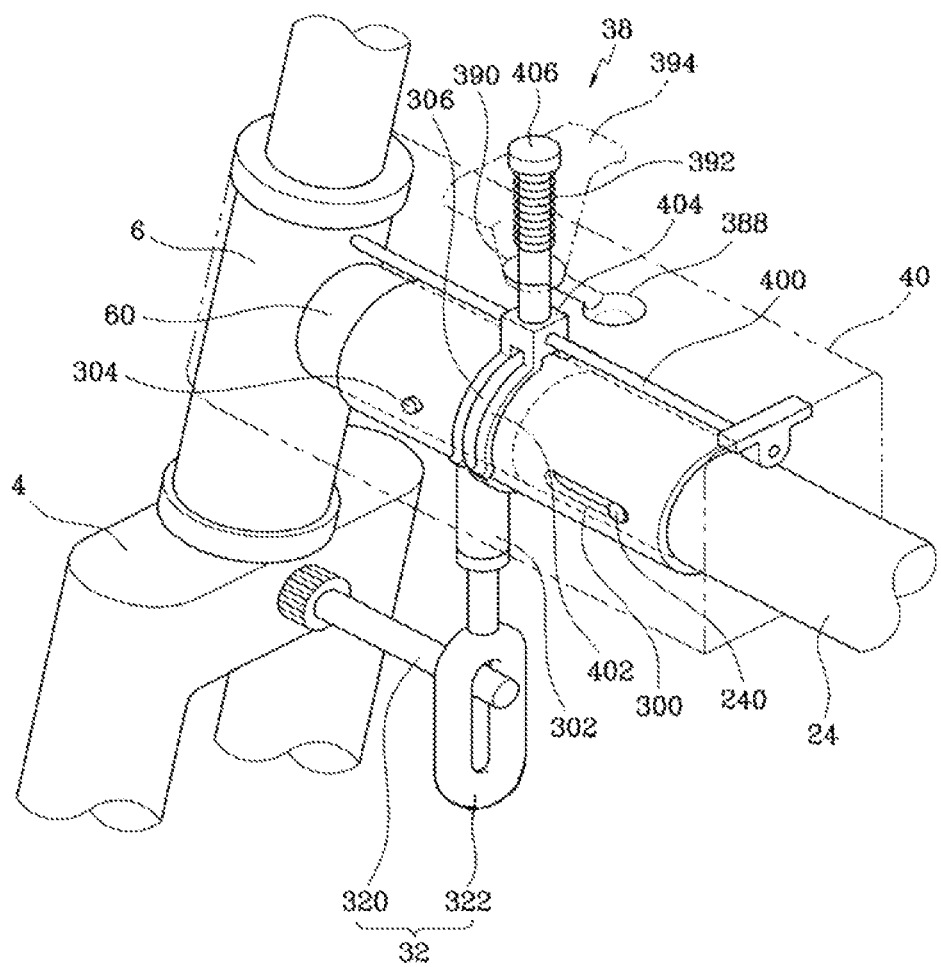
FIG. 11 is a partial perspective view for showing an un-clutch state of a clutch means in correspondence with FIG. 9.

FIG. 10 and FIG. 11 show a bicycle according to the third exemplary embodiment of the present invention as an alternative embodiment of the second exemplary embodiment.

In this exemplary embodiment, the clutch means 30 is integrally provided with an outward flange 306 at the external circumference position, and the position fixing member 38 includes a housing 40 surrounding a periphery portion from the head tube 6 to the clutch means 30, a first and second stay groove 388 and 390 communicated each other at the given position of the housing 40, a guide bar 400 disposed parallel to the upper portion of the clutch mean 40, a yoke 402 supporting the outward flange 306, a bracket 404 supporting the yoke 402 and pivotally supported by the guide bar 400, a knob shaft 406 inserted into the first and the second stay groove 388 and 390 at the upper portion of the housing 40 and having a lower end portion connected to the bracket 404, and a lock handle 394 pivotally supported by the knob shaft 406 such that it is suppressed by a locking spring 392 and engaged with the first and second stay grooves 388 and 39 at the upper surface of the housing 40.

FIG. 10 and FIG. 11 do not illustrate the pivot path and the close path; they have the same structure as that of the first exemplary embodiment, or the second exemplary embodiment. And accordingly, a detailed description thereof is omitted.

In this exemplary embodiment, when the driver grips and pulls over the locking handle 394, the locking spring 392 is compressed so that the locking handle 394 may be separated and moved from the first and second stay grooves 388 and 390. Accordingly, when the locking handle 394 is moved and safely received into the first stay groove 388, the clutch means 30 becomes the clutch state which the fixed tube 60 and the top tube 24 are integrally connected to each other. In addition, when the lock handle 394 is moved and safely received into the second stay groove 390 as shown in FIG. 11, the yoke 402 of the bracket 404 is interworked with the clutch means 30, and the clutch means becomes the un-clutch state which the fixed tube 60 is separated from the top tube 24 it is relatively rotated to it. Meanwhile, the front fork 4 is connected to the clutch means 30 via the synchronizer 32, and thus the bicycle can be used as one of the two or more seat bicycles.

FIG. 12 to FIG. 16 shows a brake system used in a bicycle according to the fourth exemplary embodiment of the present invention.

Figure 12:
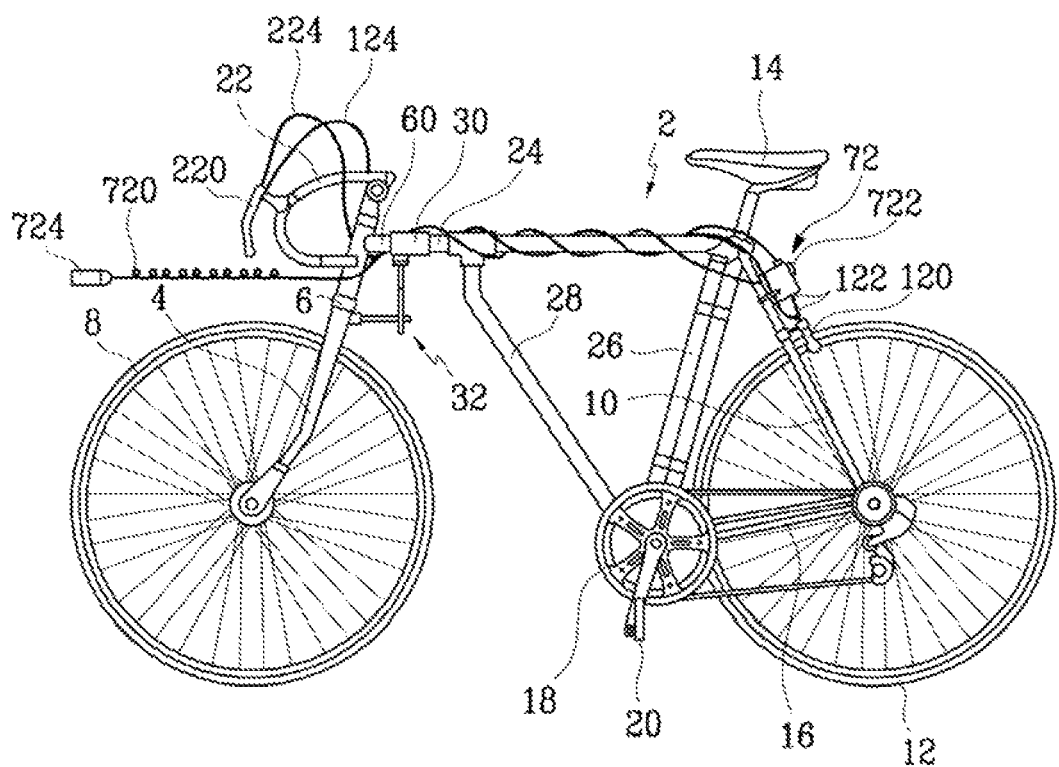
FIG. 12 is a side cross-sectional view of one seat bicycle having a brake system applied to the present invention.

The illustrated brake system is provided with a brake modulator 72 for operating a V-shaped brake 120 for the typical one seat as shown in FIG. 12, which may be disposed on an upper portion of the rear pork 10 or a lower portion of the saddle 14 or the like.

The brake modulator 72 is provided with an encoder cable 224, a connecting cable 720 connected to the just former bicycle, and socket 722.

Between the brake modulator 72 and the V-shaped brake 120 is interposed Y-shaped branch line 122, which has one end portion connected to the typical brake wire 124 and the other end portion connected to an inner portion of the brake modulator 72, and accordingly, the V-shaped brake 120 is interworked with the brake modulator 72 or the brake wire 124.

In the brake system of the present invention, U-shaped brake or drum-shaped brake may replace with the V-shaped brake 120.

It is preferable that the branch line 122 is made of a flexible material such that a load may not occur when the brake modulator 72 or the brake wire 124 is pulled.

The connecting cable 720 includes a plug 724 integrally formed thereon. It allows the plug 724 to be plugged into the socket 722 of the just former bicycle so that a signal may be transferred between the former and the latter when two or more bicycles are connected to each other.

Figure 13:
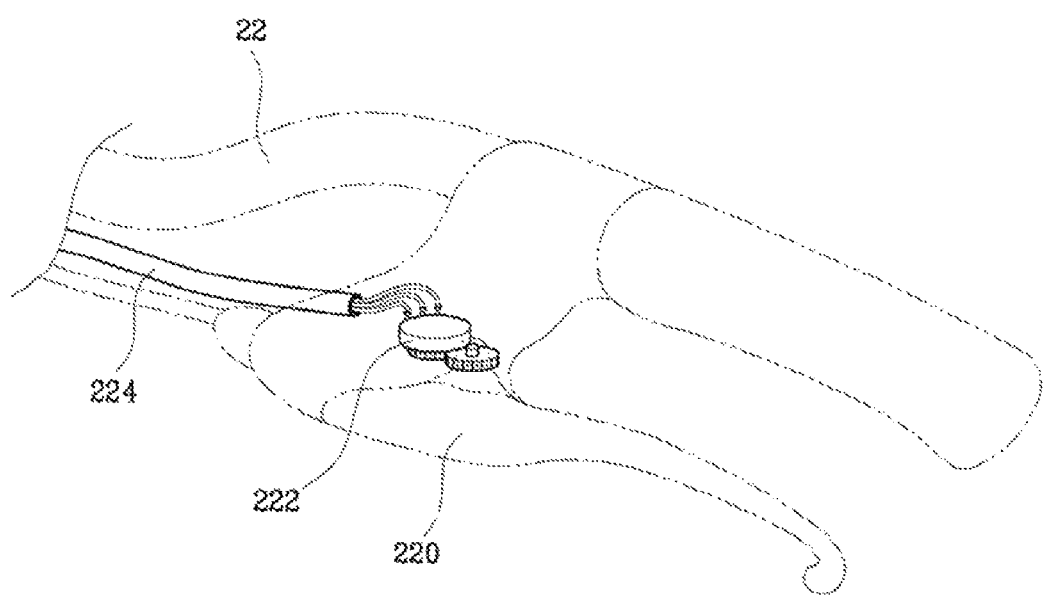
FIG. 13 is a partially cross-sectional view showing an inner structure of a brake lever for operating a brake system applied to the present invention.
Figure 14:
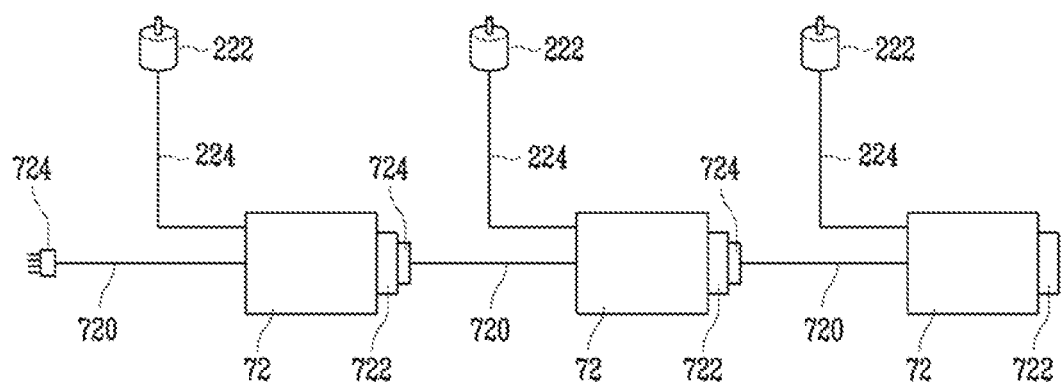
FIG. 14 is a schematic view showing a connection in a line among brake modulators of the foremost bicycle and the latter bicycles.

In addition, the encoder cable 22 is connected to a rotary encoder 222 incorporated in a brake lever 220 of the handle 22 as shown in FIG. 13.

The rotary encoder 222 includes a common fixed contact point and a pair of variable contact point which are interworked with the brake lever 220 to output a pulse signal with a time interval. The pulse signal is input into the volume-aware circuit 774 of the signal portion 77 integrated in a controlling board 74.

In case of the two or more seat bicycles, each brake modulator 72 of each bicycles allows the plug 724 of the just latter to be plugged into the socket 722 of the just former bicycle, as is repeated by the last bicycle such that all brake modulators 72 are operated at one time.

Figure 15:
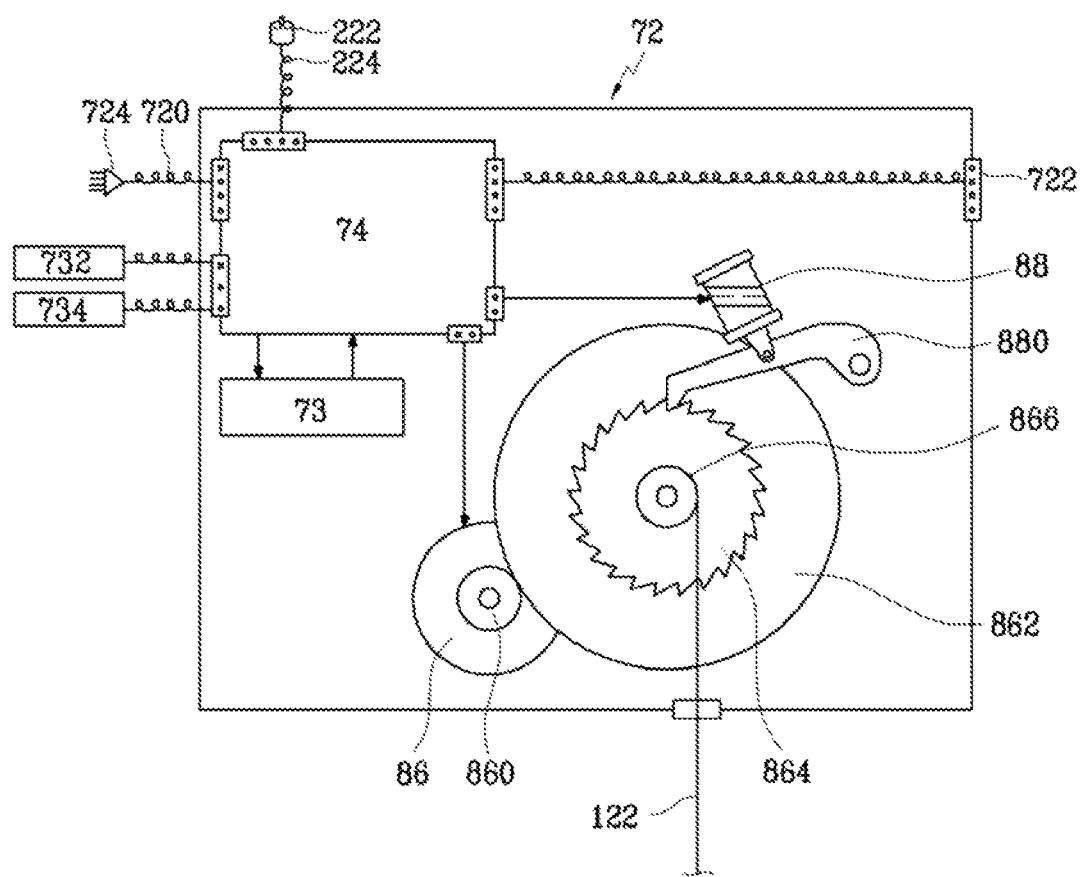
FIG. 15 is a partially cross-sectional view showing an inner structure of the brake system applied to the present invention.

As shown in FIG. 15, the brake modulator 72 includes such a circuit instrument as a battery 73 and a controlling board 74 and such a mechanical instrument as a motor 86, a solenoid 88, an output gear 860, deceleration gear 862, a ratchet 864, a spool 866, and a ratchet finger 880 which engaged with or detached with the ratchet 864 by interworking with the solenoid 88.

The spool 866 is driven by the motor 86 and is surrounded by the branch line 122, and also, the surrounded branch line 122 is raveled by means of an elastic restoring force of the spring which is provided by the given brake. In this manner, the V-shaped brake 120 is operated when the branch line 122 is spooled and raveled.

The ratchet finger 88 keeps the spool 866 from rotating by always engaging the ratchet 864 in action of gravity. When the ratchet finger 88 is attached to the solenoid 88 by means of magnetic force thereof, it may be separated form the ratchet 864 to disengage the spool 866.

In addition, when the ratchet finger 880 damps the spool 866, the branch line 122 may not be raveled from the spool 866 although the electric power is not supplied to the motor 86, and accordingly, the brake state of the bicycle is maintained.

Accordingly, the bicycle according to this exemplary embodiment has an advantage of reducing unnecessary consumption by stopping the supply of the electric power when it is not operated during a predetermined time wherever the brake lever of is disposed during driving. In addition, the bicycle may further include external instruments such as solar battery 732 or generator 734 so as to increase a life cycle of a battery 73 for supplying to the controlling board 74.

Figure 16:
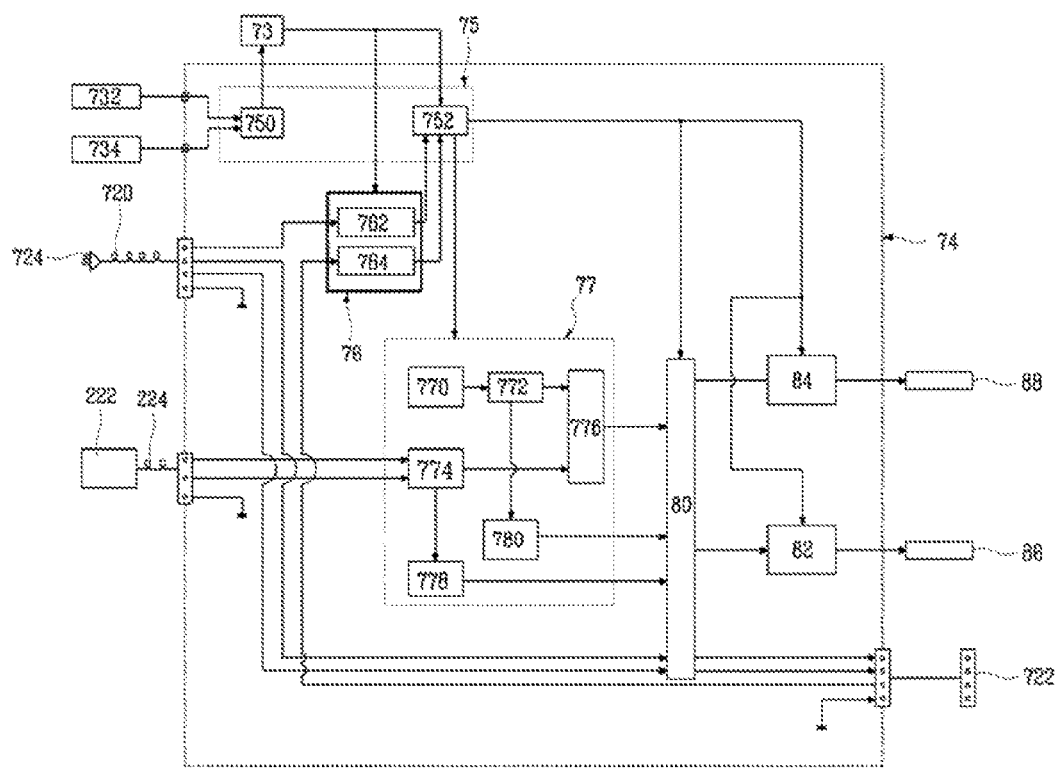
FIG. 16 is a block diagram showing a controlling board of a brake system according to the present invention.
Figure 17:
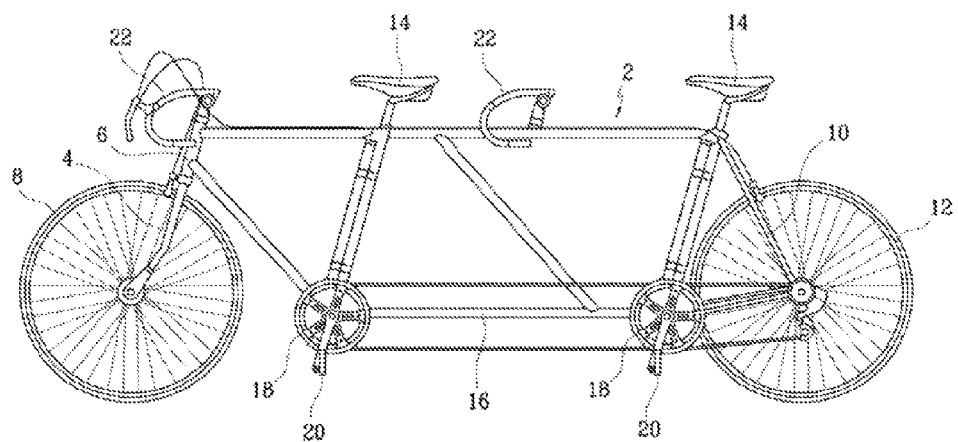
FIG. 17 is a side view showing an one exemplary embodiment of the prior bicycle built for two or more people.
Figure 18:
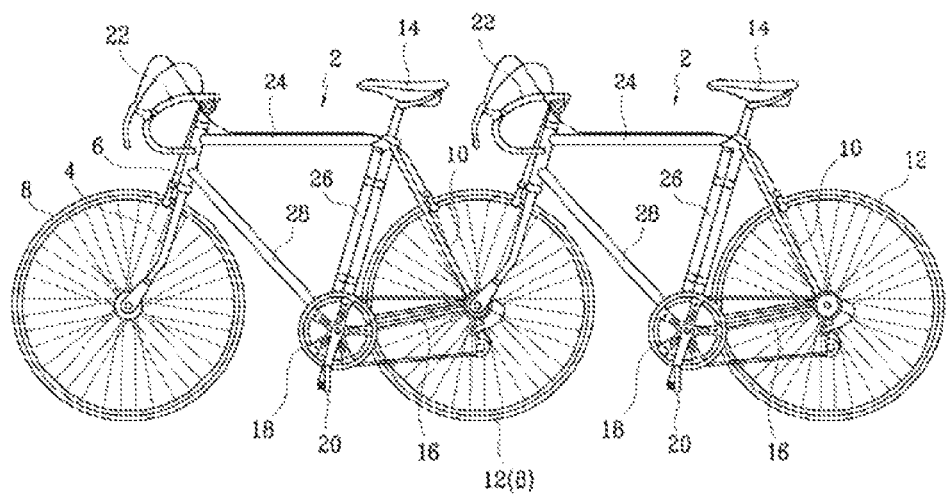
FIG. 18 is a side view showing an alternative embodiment of the prior bicycle built for two or more people.

The controlling board 74 includes a supplier 75 formed of a commutating circuit 750 and a supply determining circuit 752, a cable connection aware circuit 76 formed of a plug connection aware circuit 762 and a socket connection aware circuit 764, a signal portion 77 formed of a cluck generating circuit 770, a frequency determining circuit 772, volume aware circuit 774, pulse width modulating signal generating circuit 776, a signal continuity determining circuit 778, a solenoid driving signal generating circuit 780, and a input/output controlling circuit 80, a motor driving circuit 82, and a solenoid driving circuit 84 as shown in FIG. 16.

The supplier 75 supplies a power source of the battery 73 to the cable connection aware circuit 78, the signal portion 77, the input/output controlling circuit 80, the motor driving circuit 82, and the solenoid driving circuit 84. It may include the commutating circuit 750 for converting the input of the solar battery 732 or the generator 734 into DC and the supply determining circuit 752 for selectively supplying a power according to the order of the bicycles, i.e., the foremost or the latter bicycles.

In addition, the battery 73 may adopt a rechargeable battery or the like which is recharged though a primary battery or the current circuit 750.

The cable connection aware circuit 76 includes the plug connection aware circuit 762 for recognizing whether the plug 724 is connected to the just former socket 722 and the socket connection aware circuit 764 for recognizing whether the socket 722 is connected to the just latter plug 724, whose output signal denotes the present usage state.

That is to say, the plug connection aware circuit 762 may output "High" signal when the plug 724 is plugged to the just former socket 722 and the socket connection aware circuit 764 may output "High" signal when the socket 722 is inserted to the just latter plug 724. Thus, if any one of the plug connection aware circuit 762 and the socket connection aware circuit 764 outputs "High" signal, it is determined as the two or more seat bicycles; if any one of the plug connection aware circuit 762 and the socket connection aware circuit 764 outputs "Low" signal, it is determined as the one seat bicycle.

In addition, in case of the two or more seat bicycle, if only the socket connection aware circuit 764 outputs "High" signal, it denotes the foremost bicycle; if only the plug connection aware circuit 762 outputs "High" signal, it denotes the median bicycle disposed between the foremost bicycle and the last bicycle.

In case of the one seat bicycle, the supply determining circuit 752 is controlled such that it supplies a power source to only the cable connection aware portion 76 and it stops a supply of the power source to any other portions.

In case of the foremost bicycle, the supply determining circuit 752 is controlled such that it supplies a power source to the signal portion 77, the input/output controlling circuit 80, the motor driving circuit 82, and the solenoid driving circuit 84; in case of the last or median bicycle, it is controlled such that it stops a supply of the power source to only the signal portion 77 and each of the motor 86 and the solenoid 88 is controlled by the signal which the foremost bicycle outputs. Since the motor 86 and the solenoid 88 of all the latter bicycles are operated by means of a controlling action of the cable connection aware portion 76 according to the driving signal which the foremost bicycle outputs, the driver of the foremost bicycles may control all the bicycles simultaneously.

In the foremost bicycle, when the power source is supplied to the signal portion 77, the cluck generating circuit 770 outputs a waveform of a constant frequency, the frequency determining circuit 772 analyzes a signal waveform of the cluck generating circuit 770 as a waveform signal of the constant frequency, and applies the analyzed signal to the pulse width modulation signal generating circuit 776 and the solenoid driving signal generating circuit 780.

Meanwhile, the output variance of the rotary encoder 222, that is, the output variance of the pulse waveform occurred by operating the brake lever 220 of the foremost bicycle, is recognized by the volume aware circuit 774. At this time, if the output is varied, it applies "High" signal to the input/output circuiting circuit 80; and if the output is not varied, it applies "Low" signal to it.

That is to say, when both output terminals of the rotary encoder 222 outputs a pulse waveform by means of the operation of the brake lever 220, the volume aware circuit 774 recognizes the parallax of the input pulse and determines whether the signal is increased or decreased, and accordingly, the converted phase signal is applied to the pulse width modulation signal generating circuit 776 and the signal continuity determining circuit 778.

With above-described operation, the pulse width modulation signal generating circuit 776 assemblies the stepped waveform of the frequency determining circuit 772 and the phase signal of the volume aware circuit 774 and applies a pulse width modulation signal of a duty rate to the input/output controlling circuit 80, and the solenoid driving signal generating circuit 780 applies the solenoid driving signal of the output of the frequency determining circuit 772 to it.

The input/output controlling circuit 80 intercepts the output terminal such that the motor 86 and the solenoid 88 may not consume the power source if the "Low" signal is applied from the signal continuity determining circuit 778, in this case, the ratchet 864 is engaged with the ratchet finger 880 so that the present brake state is maintained thereby reducing the battery consumption.

In addition, when the input and output controlling circuit 80 is applied "High" signal from the signal continuity determining circuit 778, the pulse width modulation signal of the pulse width modulation signal generating circuit 776 is applied to the motor driving circuit 82 and the motor 86 is driven by the pulse width modulation signal of the duty rate and simultaneously, based on the output of the frequency determining circuit 772 outputs a solenoid driving signal to the solenoid driving circuit 84 to turn on the solenoid 88.

In a brake system according to the present invention, the solenoid 88 is turned on when the ratchet finger 880 is released from the ratchet gear 864 more fast that the motor 86 is driven, and accordingly, it does not keep the spool 866 from rotating.

It has a program such that the input and output controlling circuit 80 outputs the signal output of the driving circuit 82 than the signal output of the solenoid driving circuit 84 with a predetermined interval using the integrated timer, and accordingly, the ratchet finger 880 is separated from the ratchet 864 and then the motor 86 is driven so that the brake may be smoothly operated.

As above-described, when the bicycle that can be connected to each other is used as the two or more seat bicycle, the motor 86 and solenoid 88 of all the latter bicycles are driven by the signal applied through the socket 722 and plug 724 of the former bicycle, and accordingly, the signal may be damped and varied; However, it may be settled by including a amending circuit for amending the damped or varied waveform in the input/output controlling circuit 80.

That is, after the former output signal applied to the input/output controlling circuit 90 of all the latter bicycles are entirely amended by the amending circuit; the amended signal is output to the motor driving circuit 82 and the solenoid driving circuit 84 so that all the bicycles may be operated at the same condition.

In addition, when it is programmed such that the signal continuity determining circuit 778 receives "High" signal and converts "Low" signal during a predetermined time from when the brake lever 220 is recovered at the initial point, the signal output of the solenoid driving circuit 84 is continued during the predetermined time and the release state of the ratchet 864 is maintained during the same, in which the elastic restoring force generated by the spring of the given brake allows the branch line 122 to be raveled from the spool 866 so that the brake is recovered at the original state, and then, the signal output of the solenoid driving circuit 791 is interrupted so ensure the concise action.

Therefore, all the bicycles that connected to each other are controlled at brakes with the same signal level, and also a running safety of all the brakes of the bicycles may be ensured even when a plurality of bicycles are connected because the foremost passenger operates the brakes the same time.

The invention claimed is:

1. A bicycle having a front fork and a rear fork each supporting a center of a front wheel and a rear wheel, the bicycle comprising a fixed tube attached to a head tube for supporting a front fork, said fixed tube having a fixed shaft inserted therein,
   a top tube pivotally mounted on said fixed shaft,
   a clutch means for converting a relation between said fixed tube and said top tube from an un-clutch state to a clutch state, in which the clutch state allows said top tube to pivot relative to said fixed tube and the un-clutch state integrally connects said top tube to said fixed tube, and
   a synchronizer for controlling a pivot angle of the top tube rotation relative to said fixed tube in accordance with a steering angle of a handle.

2. A bicycle according to claim 1, wherein said synchronizer comprises a rod extending from said front fork and a guide ring extending from said clutch means, wherein said rod is inserted into said guide ring in the clutch state to synchronize the pivot angle of the top tube rotation relative to said fixed tube.

3. A bicycle according to claim 1, wherein said synchronizer comprises bevel gears connected to the front fork and the clutch means.

4. A bicycle according to claim 1, the bicycle further comprising:
   a second shaft connected to said fixed shaft at a free end of said fixed shaft opposite said head tube,
   a plurality of bearings mounted opposite to each other via a bushing on the second shaft, said bearings pivotally supporting said top tube on said second shaft;
   a fixed protrusion penetrating an external circumference portion of the top tube and attached to said top tube via the bushing;
   said clutch means defining a slit for guiding the fixed protrusion;
   a pivot path formed in an arc-shaped groove or circular shaped groove within said clutch means to define the clutch state;
   a close path formed in a dot shaped groove to define the un-clutch state on the external circumference portion of the clutch means,
   a position fixing member on the fixed shaft for holding the position of the clutch means, wherein said position fixing member is disposed to integrally connect the fixed tube and the top tube in the un-clutch state and to pivot the top tube in relation to the fixed tube in the clutch state, and
   a synchronizer for controlling a pivot angle of the top tube rotated relatively to the fixed tube to be in accordance with a steering angle of a handle.

5. A bicycle according to claim 4, wherein said position fixing member comprises a boll inserted via a spring into either the pivot path or the close path.

6. A bicycle having a front fork and a rear fork each supporting a center of a front wheel and a rear wheel,
   the bicycle comprising:
   a fixed tube attached to a head tube for supporting the front fork,
   a fixed shaft inserted into the fixed tube, said fixed shaft connected to a second shaft at a free end of said fixed shaft opposite said fixed tube,
   a plurality of bearings mounted opposite to each other via a bushing on the second shaft;
   a top tube pivotally supported on said bearings,
   a fixed protrusion penetrating the external circumference portion of said top tube and attached to said top tube via the bushing;
   a clutch means having a slit for guiding the fixed protrusion and positioning said clutch means in either a clutch state in which the top tube is rotated relative to the fixed tube or an un-clutch state in which the top tube is not relatively rotated relative to the fixed tube,
   a pivot path formed in an arc-shaped groove or circular shaped groove at the external circumference portion of the fixed shaft to define a clutch state,
   a close path formed in a groove in said fixed shaft orthogonal to said pivot path to define an un-clutch state,
   a position fixing member for holding the position of said clutch means and connecting the fixed tube and the top tube in either the un-clutch state to prevent the pivoting of the top tube relative to the fixed tube or in the clutch state to allow the pivoting of the top tube relative to the fixed tube, and
   a synchronizer for controlling a pivot angle of the top tube rotated to the fixed tube to be in accordance with a steering angle of a handle.

7. A bicycle according to claim 6, wherein said position fixing member comprises a boll inserted into either the pivot path or the close path.

8. A bicycle according to claim 6, wherein said synchronizer comprises a rod extending from said front fork and a guide ring extending from said clutch means, wherein said rod is inserted into said guide ring in the clutch state to synchronize the pivot angle of the top tube rotation relative to said fixed tube.

9. A bicycle according to claim 6, wherein said synchronizer comprises bevel gears connected to the front fork and the clutch means.

10. A bicycle according to claim 6, wherein:
said position fixing member is an inward protrusion on said clutch means that engages either the pivot path or the close path to establish the respective clutch or un-clutch state.

11. A bicycle according to claim 6, wherein said clutch means defines a slit for guiding the fixed protrusion portion.

12. A bicycle according to claim 6, further comprising an outer flange on an external circumference of said clutch means for moving said position fixing member between the un-clutch state and the clutch state.

13. A bicycle according to claim 12, further comprising:
a housing surrounding an upper portion of the head tube and the clutch means, said housing defining first and second openings;
a bracket connected to said outer flange of the clutch means;
a guide bar supporting the bracket in the housing; and
a lock handle that moves into either of the first and second openings so as to move the bracket along the guide bar, thereby moving the clutch means between the clutch state and the un-clutch state.

14. The bicycle of claim 13 further comprising a clamp for surrounding said clutch means, a cam shaft penetrating both ends of the clamp and having a flange at an one end of said cam shaft, and a knob on said cam shaft to tighten or release the clamp and thereby engage said positioning member into the clutch state or the un-clutch state.

\* \* \* \* \*